US009661144B2

(12) United States Patent
Shahaf et al.

(10) Patent No.: US 9,661,144 B2
(45) Date of Patent: *May 23, 2017

(54) METHOD AND APPARATUS FOR PRIORITY SUMMING OF GROUP AUDITORY DATA

(71) Applicant: MOTOROLA SOLUTIONS, INC, Schaumburg, IL (US)

(72) Inventors: Mark Shahaf, Vernon Hills, IL (US); Arthur L Fumarolo, Schaumburg, IL (US); Daniel J McDonald, Cary, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 497 days.

This patent is subject to a terminal disclaimer.

(21) Appl. No.: 14/025,955

(22) Filed: Sep. 13, 2013

(65) Prior Publication Data

US 2015/0079919 A1    Mar. 19, 2015

(51) Int. Cl.
*H04M 3/56* (2006.01)
*H04W 4/08* (2009.01)
(Continued)

(52) U.S. Cl.
CPC ........ *H04M 3/568* (2013.01); *H04L 65/4038* (2013.01); *H04L 65/80* (2013.01);
(Continued)

(58) Field of Classification Search
CPC ......... H04M 3/568; H04W 4/08; H04W 4/22; H04W 4/10; H04L 65/4038; H04L 65/80
See application file for complete search history.

(56) References Cited

U.S. PATENT DOCUMENTS 5,423,061 A * 6/1995 Fumarolo ............. H04W 84/08
                                                    455/512
6,005,848 A   12/1999 Grube et al.
(Continued)

FOREIGN PATENT DOCUMENTS

WO     9610869 A1    4/1996
WO     02089501 A1   11/2002
WO     2011008789 A1  1/2011

OTHER PUBLICATIONS

USA Office Action Dated Jul. 8, 2015 for Related U.S. Appl. No. 14/025,998.

*Primary Examiner* — Lester Kincaid
*Assistant Examiner* — William Wang
(74) *Attorney, Agent, or Firm* — Daniel R. Bestor

(57) ABSTRACT

A first group auditory data stream, from a transmitting subscriber device of a first group of subscriber devices or from a dispatch console and intended for the first group of subscriber devices, is received at a conference server. A second group auditory data stream from a transmitting subscriber device of a second group of subscriber devices is similarly received. The conference server determines a relative priority level of one of (i) the first group of subscriber devices relative to the second group of subscriber devices and (ii) the first group auditory data stream relative to the second group auditory data stream, and sets different relative signal gains of the first group auditory data stream and the second group auditory data stream as a function of the determined relative priority level. The two auditory data streams are then summed and forwarded towards the second group of subscriber devices.

20 Claims, 3 Drawing Sheets

(51) Int. Cl.
*H04W 4/22* (2009.01)
*H04W 4/10* (2009.01)
*H04L 29/06* (2006.01)

(52) U.S. Cl.
CPC ............... *H04W 4/08* (2013.01); *H04W 4/10* (2013.01); *H04W 4/22* (2013.01)

(56) References Cited

U.S. PATENT DOCUMENTS

| | | |
|---|---|---|
| 6,011,851 A | 1/2000 | Connor et al. |
| 6,308,079 B1 | 10/2001 | Pan et al. |
| 6,584,324 B1 | 6/2003 | Vivekanandan |
| 6,792,281 B2 | 9/2004 | Upp et al. |
| 6,895,254 B2 | 5/2005 | Dorenbosch |
| 6,928,063 B2 | 8/2005 | Pancha et al. |
| 6,944,137 B1 | 9/2005 | Pan et al. |
| 7,209,763 B2 | 4/2007 | Martin et al. |
| 7,684,816 B2 | 3/2010 | Furrer et al. |
| 7,860,070 B2 | 12/2010 | Shaffer et al. |
| 7,925,246 B2 | 4/2011 | McKibben et al. |
| 7,945,624 B2 | 5/2011 | Guccione |
| 8,041,057 B2 | 10/2011 | Xiang et al. |
| 8,078,188 B2 | 12/2011 | Zivney |
| 8,126,494 B2 | 2/2012 | Shaffer et al. |
| 8,145,249 B2 | 3/2012 | Shaffer et al. |
| 8,150,450 B1 | 4/2012 | Wengrovitz |
| 8,355,691 B2 | 1/2013 | Roy et al. |
| 2004/0052218 A1* | 3/2004 | Knappe ............ H04M 3/42187 370/260 |
| 2005/0239486 A1 | 10/2005 | D'Avello et al. |
| 2006/0063551 A1* | 3/2006 | Martin .................... H04M 3/56 455/519 |
| 2006/0079262 A1 | 4/2006 | Harris et al. |
| 2007/0104121 A1* | 5/2007 | Shaffer ............... H04L 65/4061 370/276 |
| 2007/0299661 A1* | 12/2007 | Raad .................... H04M 3/568 704/221 |
| 2008/0102869 A1* | 5/2008 | Shaffer .................. H04W 4/10 455/518 |
| 2008/0159128 A1 | 7/2008 | Shaffer et al. |
| 2009/0143007 A1 | 6/2009 | Terlizzi |
| 2009/0312045 A1* | 12/2009 | Miller .................... H04W 4/08 455/519 |
| 2010/0159975 A1* | 6/2010 | Shaffer ............... H04W 76/062 455/516 |
| 2010/0165889 A1* | 7/2010 | Madabhushi ....... H04M 3/2227 370/261 |
| 2010/0197333 A1* | 8/2010 | Shaffer ................. H04W 4/021 455/515 |

* cited by examiner

METHOD AND APPARATUS FOR PRIORITY SUMMING OF GROUP AUDITORY DATA

BACKGROUND OF THE INVENTION

Radio access networks (RANs) provide for radio communication links to be arranged within the network between a plurality of user terminals. Such user terminals may be mobile and may be known as 'mobile stations' or 'subscriber devices.' At least one other terminal, e.g. used in conjunction with subscriber devices, may be a fixed terminal, e.g. a base station, eNodeB, repeater, and/or access point. Such a RAN typically includes a system infrastructure which generally includes a network of various fixed terminals, which are in direct radio communication with the subscriber devices. Each of the fixed terminals operating in the RAN may have one or more transceivers which may, for example, serve subscriber devices in a given region or area, known as a 'cell' or 'site', by radio frequency (RF) communication. The subscriber devices that are in direct communication with a particular fixed terminal are said to be served by the fixed terminal. In one example, all radio communications to and from each subscriber device within the RAN are made via respective serving fixed terminals. Sites of neighboring fixed terminals may be offset from one another and may be non-overlapping or partially or fully overlapping with one another.

RANs may operate according to an industry standard protocol such as, for example, an open media alliance (OMA) push to talk (PTT) over cellular (OMA-PoC) standard, a voice over IP (VoIP) standard, or a PTT over IP (PoIP) standard. Typically, protocols such as PoC, VoIP, and PoIP are implemented over broadband RANs including third generation and fourth generation networks such as third generation partnership project (3GPP) Long Term Evolution (LTE) networks.

RANs may additionally or alternatively operate according to an industry standard land mobile radio (LMR) protocol such as, for example, the Project 25 (P25) standard defined by the Association of Public Safety Communications Officials International (APCO), or other radio protocols, the TETRA standard defined by the European Telecommunication Standards Institute (ETSI), the Digital Private Mobile Radio (dPMR) standard also defined by the ETSI, or the Digital Mobile Radio (DMR) standard also defined by the ETSI. Because these generally systems provide lower throughput than the 3 GPP and LTE systems, they are sometimes designated narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) protocols. Subscriber devices in RANs such as those set forth above send and receive auditory data (encoded voice, audio, or audio portions of an audio/video stream) in accordance with the designated protocol.

OMA-PoC, in particular, enables familiar PTT and "instant on" features of traditional half duplex subscriber devices, but uses mobile subscriber devices operating over modern cellular telecommunications networks. Using PoC, wireless subscriber devices such as mobile telephones and notebook computers can function as PTT half-duplex subscriber devices for transmitting and receiving auditory data. Other types of PTT models and multimedia call models (MMCMs) are also available.

Floor control in an OMA-PoC session is generally maintained by a PTT server that controls communications between two or more wireless subscriber devices. When a user of one of the subscriber devices keys a PTT button, a request for permission to speak in the OMA-PoC session is transmitted from the user's subscriber device to the PTT server using, for example, a real-time transport protocol (RTP) message. If no other users are currently speaking in the PoC session, an acceptance message is transmitted back to the user's subscriber device and the user can then speak into a microphone of the device. Using standard compression/decompression (codec) techniques, the user's voice is digitized and transmitted using discrete auditory data packets (e.g., together which form an auditory data stream over time), such as according to RTP and internet protocols (IP), to the PTT server. The PTT server then transmits the auditory data packets to other users of the PoC session (e.g., to other subscriber devices in the group of subscriber devices or talkgroup to which the user is subscribed), using for example a unicast, point to multipoint, or broadcast communication technique.

Narrowband LMR systems, on the other hand, operate in either a conventional or trunked configuration. In either configuration, a plurality of subscriber devices are partitioned into separate groups of subscriber devices. In a conventional system, each subscriber device in a group is selected to a particular frequency for communications associated with that subscriber device's group. Thus, each group is served by one channel, and multiple groups may share the same single frequency (in which case, in some embodiments, group IDs may be present in the group data to distinguish between groups using the same shared frequency).

In contrast, a trunked radio system and its subscriber devices use a pool of traffic channels for virtually an unlimited number of groups of subscriber devices (e.g., talkgroups). Thus, all groups are served by all channels. The trunked radio system works to take advantage of the probability that not all groups need a traffic channel for communication at the same time. When a member of a group requests a call on a control or rest channel on which all of the subscriber devices in the system idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the subscriber devices were idling to a traffic channel for the call, and instruct all subscriber devices that are not participating in the new call to move to a newly assigned control or rest channel selected from the pool of available channels. With a given number of channels, a much greater number of groups can be accommodated in a trunked system as compared with conventional radio systems.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., subscriber devices) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, subscriber devices may dynamically affiliate with a group (and also disassociate with the group) perhaps based on user input, and the switching and/or radio network may track group membership and route new group calls according to the current group membership.

One problem that has arisen with the use of groups to distribute auditory data to subscriber devices is that a situation may arise where a particularly important message or communication needs to be distributed across multiple groups or across all groups in a radio communication system. Various attempts at addressing this problem have been proposed and/or implemented in the past, including, for example, implementation of an "all-call" feature in which a particular subscriber device (perhaps having appropriate permissions) can transmit a message to all subscriber devices in the radio communication system. However, the all-call feature does not provide any granularity regarding which groups to transmit the message to (or which not to), and it also causes all other group calls occurring at the time to be terminated in favor of the all-call. Another proposed solution, called a dynamic regroup or group regroup, is able to form a new group containing all subscriber device members of prior designated groups. This feature, however, similarly loses the granularity of having the separate groups that existed prior to the regroup, and may also require the termination of one or all ongoing calls existing in the groups prior to the regroup. Still one other proposed solution involves using conference bridging to bridge groups together. However, in this situation, all auditory data from each active group travels to every other group in the bridge (e.g., all groups in the bridge are mixed together) at a same volume, which may cause increased confusion and difficulty in communicating across groups.

Accordingly, what is needed is an improved method and apparatus for allowing auditory data transmitted in one group to be received and heard in one or more other groups with its relative priority taken into consideration to avoid confusion and difficulty in communication across groups, and without requiring any ongoing calls in the other groups to be terminated.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
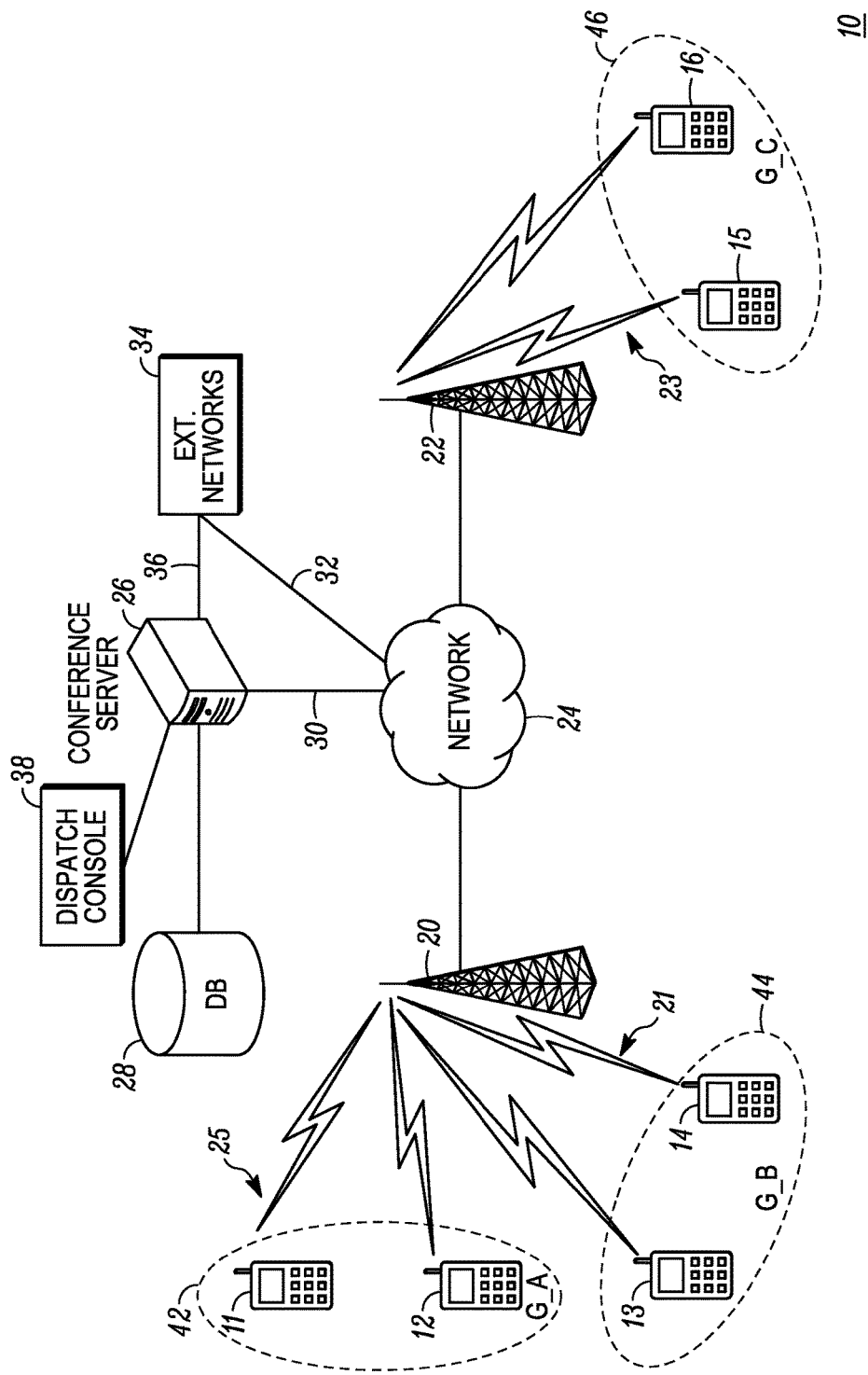
FIG. 1 is a block diagram of a communications network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved method and apparatus for allowing auditory data transmitted in one group to be received and heard in one or more other groups with its relative priority taken into consideration to avoid confusion and difficulty in communication across groups, and without requiring any ongoing calls in the other groups to be terminated. In one embodiment, a first group auditory data stream, from a transmitting subscriber device of a first group of subscriber devices or from a dispatch console and intended for the first group of subscriber devices, is received at a conference server. A second group auditory data stream from a transmitting subscriber device of a second group of subscriber devices is similarly received at the conference server. The conference server determines a relative priority level of one of (i) the first group of subscriber devices relative to the second group of subscriber devices and (ii) the first group auditory data stream relative to the second group auditory data stream, and sets different relative signal gains of the first group auditory data stream and the second group auditory data stream as a function of the determined relative priority level. The two auditory data streams are then summed in accordance with the set different relative signal gains and forwarded towards the second group of subscriber devices.

In another embodiment, a conference server for priority summing of group auditory data comprises a transceiver, a data store, and one or more processors configured to: receive a first group auditory data stream, from a transmitting subscriber device of a first group of subscriber devices or from a dispatch console and intended for the first group of subscriber devices, receive a second group auditory data stream from a transmitting subscriber device of a second group of subscriber devices is similarly received at the conference server, determine a relative priority level of one of (i) the first group of subscriber devices relative to the second group of subscriber devices and (ii) the first group auditory data stream relative to the second group auditory data stream, and set different relative signal gains of the first group auditory data stream and the second group auditory data stream as a function of the determined relative priority level, and then sum the two auditory data streams in accordance with the set different relative signal gains and forward the summed auditory data stream towards the second group of subscriber devices.

Each of the above-mentioned embodiments will be discussed in more detail below, starting with example network and device architectures of the system in which the embodiments may be practiced, followed by an illustration of processing steps and message transmissions for supporting priority summing of group auditory data from a system perspective. Further advantages and features consistent with this disclosure will be set forth in the following detailed description, with reference to the figures.

1. Network Architecture and Device Structure

FIG. 1 illustrates a communications network 10 including client subscriber devices (e.g., SDs) 11-16, fixed terminals 20, 22 (e.g. base stations (BSs)), wireless links 21, 23, 25, backhaul network 24, conference server 26, database 28, communications connections 30, 32, 36, dispatch console 38, and external networks 34. Each BS 20, 22 has at least one radio transmitter covering a radio coverage cell (not shown). One or several SDs 11-16 within radio coverage of the BSs may connect to the BSs using a wireless communication protocol via wireless links 21, 23, 25. The SDs 11-16 may communicate with each other, and perhaps other devices accessible via other network links, using a group communications protocol over wireless links 20, 22. Wireless links 21, 23 may be, for example, a wireless link supporting a standard or protocol such as GPRS or UMTS, 2G (e.g. GSM), 3G (e.g. WCDMA or LTE), 4G (WiMAX or LTE), iDEN, wireless LAN (WLAN), ETSI Digital Mobile Radio (DMR), Project 25 (P25) standard defined by the Association of Public Safety Communications Officials International (APCO), or other radio protocols or standards. The SDs 11-16 may be configured with an identification reference (such as an International Mobile Subscriber Identity (IMSI)) which may be connected to a physical media (such as a Subscriber Identity Module (SIM) card).

Each SD 11-16 may be a group communications device, such as a push-to-talk (PTT) device, that is normally maintained in a monitor only mode, and which switches to a transmit-only mode (for half-duplex devices) or transmit and receive mode (for full-duplex devices) upon depression or activation of a PTT input switch. The group communications architecture in communications network 10 allows a single SD, such as SD 11, to communicate with one or more members (such as SD 12) associated with a particular group of SDs at the same time. In the example set forth in FIG. 1, SDs 11 and 12 are members of a first group G_A 42, SDs 13 and 14 are members of a second group G_B 44, and SDs 15 and 16 are members of a third group G_C 46.

Although only six SDs and two BSs are illustrated in FIG. 1, the present disclosure is not limited as such, and more or fewer SDs and more or fewer BSs could be used in any particular implementation. Furthermore, while a single conference server 26 is illustrated in FIG. 1, more than one conference server 26 may be used and/or a distributed conference server 26 may be used that divides functions across multiple devices, perhaps for load balancing reasons. Finally, while database 28 is illustrated as directly coupled to conference server 26, database 28 may also be remote from conference server 26 and accessible to conference server 26 via one or more of network 24 and/or external networks 34.

The BSs 20, 22 may be linked to the conference server 26 via network 24 and communications connection 30. Network 24 may comprise one or more BSs, routers, switches, LANs, WLANs, WANs, access points, or other network infrastructure. For example, conference server 26 may be accessible to BSs 20, 22 via a dedicated wireline or via the Internet. In one example, BSs 20, 22 may be directly coupled to conference server 26 via one or more internal links under control of a single communications network provider. Network 24 may further include a call controller, PTT server, zone controller, mobile management entity (MME), base station controller (BSC), mobile switching center (MSC), site controller, Push-to-Talk controller, or other network device for controlling and distributing group auditory data amongst SDs via respective BSs.

Conference server 26 may be a separate device configured to determine which groups should be shared with which other groups (e.g., which of the other groups are 'interested in,' subscribed to, or lower priority than a source group, for receiving auditory data from an active group, or, in some examples, that all group auditory data is to be shared with all other groups), and to responsively sum the auditory data from the source group(s) with existing auditory data in each interested target group (if any, or all), taking relative priority of the groups into consideration when setting signal gain levels for the summing, before forwarding the summed auditory data out to the SDs in the interested target groups. Auditory data may be provided to the conference server 26 for summing via communications connection 30. In other embodiments, conference server 26 may be embodied within or coupled to another network device, such as a call controller, PTT server, zone controller, MME, BSC, MSC, site controller, Push-to-Talk controller, or other network device, existing in network 24 or elsewhere, in which case auditory data could be provided to the conference server 26 via the another network device for summing. Importantly, the term "auditory data" is not intended to be limited to voice communications, but rather, to embody all possible digitized auditory payloads, including but not limited to, voice, audio, and/or audio portions of a combined audio/video stream.

Database 28 may function to store various mappings, such as a group priority mapping for use determining relative signal gains to be applied to corresponding auditory data received from respective groups, or for storing other mappings. The stored mapping(s) can be used by the conference server 26 to determine whether a particular source group's auditory data should have its signal gain relatively increased (e.g., amplified) or relatively decreased (e.g., attenuated) with respect to current auditory data (if any) of interested, subscribed, all, or lower or higher priority target group(s).

The one-to-many group communication structure may be implemented in communications network 10 in a number of ways and using any one or more messaging protocols, including multiple unicast transmissions (each addressed to a single group member SD), single multicast transmissions (addressed to a single group or multiple groups), single broadcast transmissions (the broadcast transmission perhaps including one or more group identifiers that can be decoded and matched by the receiving SDs), or any combination thereof.

External networks 34 may also be accessible to BSs 20, 22 (and thus SDs 11-16) via network 24 and communications connection 32 and/or conference server 26 and communications connections 30, 36. External networks 34 may include, for example, a public switched telephone network (PSTN), the Internet, or another wireless service provider's network, among other possibilities.

Communications system 10 may implement, in one embodiment, a narrow-band trunked radio communication system in which SDs 11-16 transmit control and data messages in accordance with an air interface protocol such as that defined by the DMR or APCO P25 standards. In this embodiment, wireless links 21, 23, 25 may be shared channels based on group. For example, group G_A 42 SDs 11 and 12 may share a same conventional (statically assigned frequency) or trunked (dynamically assigned frequency and/or timeslot) channel over narrowband wireless link 25, group G_B 44 SDs 13 and 14 may share a same conventional or trunked channel over narrowband wireless link 21, and group G_C SDs 15 and 16 may share a same conventional or trunked channel over narrowband wireless link 23. Other types of conventional or trunked protocols could be implemented as well.

In another embodiment, communications system 10 may implement an OMA-PoC or PoIP broadband architecture in which SDs 11-16 transmit control and data messages in accordance with a protocol such as RTP and/or SIP. In this embodiment, wireless links 21, 23, 25 may carry individual broadband IP links over which group traffic is unicast, multicast, or broadcast. For example, group G_A 42 SDs 11 and 12 may establish unicast, multicast, and/or broadcast IP links over broadband wireless link 25, group G_B 44 SDs 13 and 14 may establish unicast, multicast, and/or broadcast IP links over broadband wireless link 21, and group G_C SDs 15 and 16 may establish unicast, multicast, and/or broadcast IP links over broadband wireless link 23. Other types of broadband protocols could be implemented as well.

Dispatch console 38 may be directly coupled to conference server 26 as shown, or may be indirectly coupled to conference server 26 via one or more of network 24 and external networks 34, or some other network device such as a radio controller in network 24. The dispatch console 38 may provide an administrative or dispatch access to SDs 11-16 and conference server 26, and allow an administrator or dispatcher to initiate infrastructure-sourced group communications to groups of SDs 11-16, including the priority summing function provided by conference server 26, among other features and functions.

Figure 2:
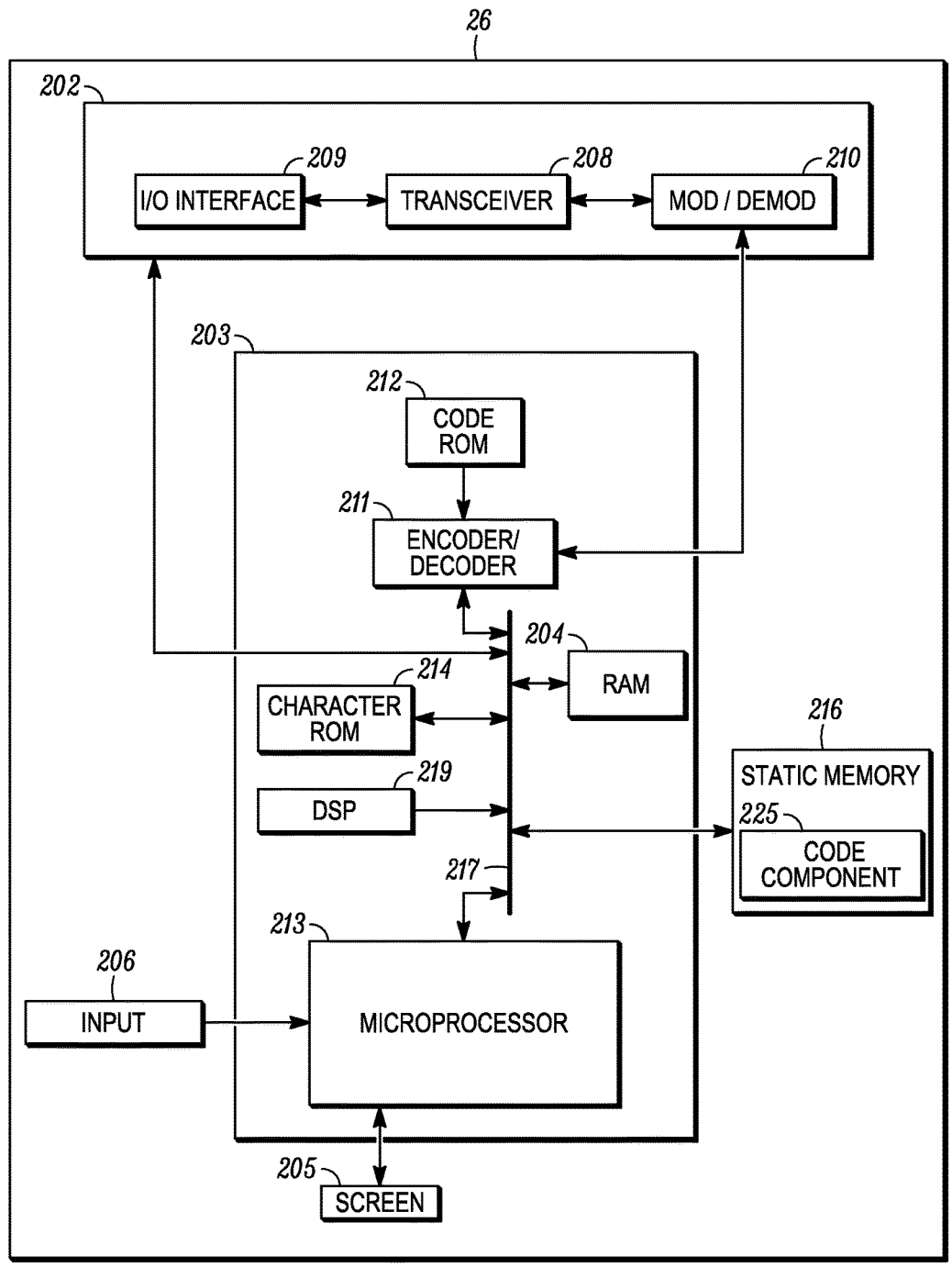
FIG. 2 is a block diagram of a conference server in accordance with some embodiments.

Referring to FIG. 2, a block diagram illustrates a conference server 26 used in accordance with some embodiments. The conference server 26 includes a communications unit 202 coupled to a common data and address bus 217 of a processing unit 203. The conference server 26 may also include an input unit (e.g., keypad, pointing device, etc.) 206 and a display screen 205, each coupled to be in communication with the processing unit 203.

The processing unit 203 may include an encoder/decoder 211 with an associated code ROM 212 for storing data for encoding and decoding voice, data, control, or other signals that may be transmitted or received by the conference server 26. The processing unit 203 may further include a microprocessor 213 coupled, by the common data and address bus 217, to the encoder/decoder 211, a character ROM 214, a RAM 204, and a static memory 216. The processing unit 203 may also have access to a secure key store, perhaps stored in one or more of RAM 204 and static memory 216, for retrieving corresponding encryption keys for link and/or end-to-end decrypting incoming encrypted auditory data streams and encrypting outgoing (summed or un-summed) auditory data streams.

The processing unit 203 may also include a digital signal processor (DSP) 219, coupled to the common data and address bus 217, for operating on auditory data streams received from one or more SDs or the static memory 216. For those encrypted incoming auditory data streams, the streams may be decrypted prior to being provided to the DSP 219. For example, the DSP may be configured to, upon request, receive two separate (digital) incoming auditory data streams and mix them, in the parametric domain using respectively assigned relative signal gains applied to one or both of the decoded streams, and provide a summed output auditory data stream that is a summation of the two input auditory data streams. In other embodiments, the DSP may be configured, upon request, to receive two separate digital auditory data streams, decode each auditory data stream using an appropriate (Improved Multi-Band Excitation (IMBE) or Advanced Multiband Excitation (AMBE), for example) algorithm, apply respectively assigned relative signal gains to one or both of the decoded streams, combine them in the time domain, and then re-encode the summed auditory data using the same or similar algorithm before providing the summed output auditory data stream that is a summation of the two input auditory data streams. The summed output (digital) auditory data stream may then optionally be encrypted prior to being transmitted out towards respective target groups of subscriber devices.

The communications unit 202 may include an I/O interface 209 configurable to communicate with network components (for example, a call controller, database, or dispatch console), and other user equipment (for example, SDs) communicatively coupled to the conference server 26. The communications unit 202 may include one or more broadband and/or narrowband transceivers 208, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. Additionally or alternatively, the communications unit 202 may include one or more local area network or personal area network transceivers such as a Wi-Fi transceiver perhaps operating in accordance with an IEEE 802.11 standard (e.g., 802.11a, 802.11b, 802.11g), or a Bluetooth transceiver, for SD to SD communications. Additionally or alternatively, the communications unit 202 may include one or more wire-line transceivers 208, such as an Ethernet transceiver, a Universal Serial Bus (USB) transceiver, or similar transceiver configurable to communicate via a twisted pair wire, a coaxial cable, a fiber-optic link or a similar physical connection to a wire-lined network.

The transceivers may be coupled to a combined modulator/demodulator 210 that is coupled to the encoder/decoder 211. The character ROM 214 stores code for decoding or encoding data such as control, request, or instruction messages, and/or auditory data that may be transmitted or received by the conference server. Static memory 216 may store operating code 225 associated with determining which groups should be shared with which other groups (or all groups), and a relative priority between the groups, and to responsively sum auditory data from an active group with auditory data from one or more of the other groups, applying relative gains in accordance with the determined relative priority, before forwarding the summed auditory data out to the target groups of SDs, including one or more of the processing steps and message transmissions and/or receptions set forth in FIG. 3. Static memory 216 may further store digital audio tones for summing with one or more group auditory data streams upon request.

2. Process for Priority Summing of Group Auditory Data

Figure 3:
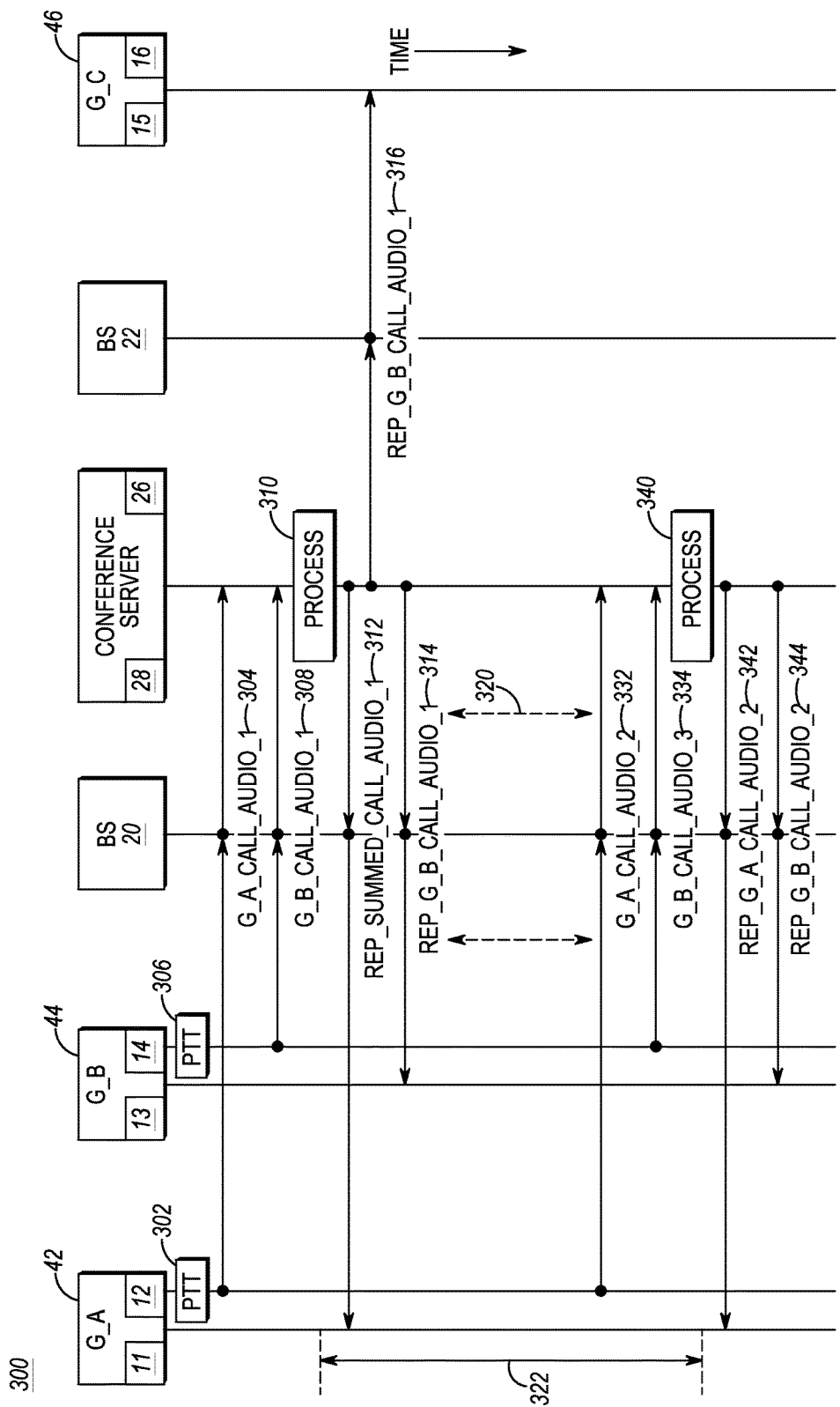
FIG. 3 is a timing diagram illustrating processing steps and message transmissions across devices in the communications network of FIG. 1 for implementing priority summing of group auditory data in accordance with an embodiment.

FIG. 3 sets forth a timing diagram 300 illustrating an example in a communications network, such as communications network 10 of FIG. 1, of priority summing of group auditory data consistent with the present disclosure. Of course, additional steps, receptions, and/or transmissions not disclosed herein could be additionally added before, after, or in-between steps, receptions, and/or transmissions disclosed in FIG. 3, and the presence of such additional steps, receptions, and/or transmissions would not negate the purpose and advantages of the examples set forth in detail throughout the remainder of this disclosure.

Although not illustrated in FIG. 3, it is assumed that groups G_A 42, G_B 44, and G_C 46 have already been created and affiliated with by respective SDs 11-16 prior to the first process step 302.

While a group of SDs may be created in any number of ways, in a first example of setting up a group, a user of the SD or perhaps a communications network operator may statically define affiliated member SDs with a particular group and assign the group a particular group ID (identifier), and in a second example, users of SDs interested in a particular group may dynamically affiliate (and/or disassociate) with that group and a controller may be configured to track group membership and route calls accordingly. A database, such as database 28 of FIG. 1 or similar thereto, may store affiliation information that maps the SDs with each particular group (and thus group ID) with which it is (statically or dynamically) affiliated. Group IDs used to uniquely identify the group of SDs to which a group call is directed may be included in a call request, included in a call header preceding or appended to a group call transmission, and/or embedded in group call transmissions sent from SDs themselves (for example, in a trunked DMR system). In a still further embodiment, an identity of a conventional channel on which the group call was received (for example, in a conventional P25 system) may be used to identify a group of SDs operating on that conventional channel. Identifiers used to distinguish channels in conventional systems may be associated with the frequency on which that channel operates, or may be some alpha-numeric string assigned by a conventional system operator, among other possibilities.

Furthermore, while a new group call generally requires a call setup procedure including a call request transmitted by the call initiating SD and a call grant acknowledging and granting the requested group call transmitted back to the call initiating SD via its serving BS, such details are well known to one of ordinary skill are not illustrated in FIG. 3 for ease of illustration purposes.

In any event, at step 302, an SD 12 that is a member of group G_A 42 detects the depression of a PTT button indicating a desire of its user to transmit auditory data to other SDs in its subscribed group G_A 42 (in this example, including only SD 11). Accordingly, and in response, the SD 12 captures its user's voice (assuming voice was intended to be transmitted, instead of some other audio and/or audio/video), encodes the voice into one or more voice packets, and transmits the one or more voice packets in a G_A_call_audio_1 304 (a first portion of a first group auditory data stream for group G_A) transmission to its serving BS 20, which then forwards the auditory data to the conference server 26.

At step 306, at or about the same time as step 302, an SD 14 that is a member of group G_B 44 similarly detects the depression of a PTT button indicating a desire of its user to transmit auditory data to other SDs in its subscribed group G_B 44 (in this example, including only SD 13). Accordingly, and in response, the SD 14 captures its user's voice (assuming voice was intended to be transmitted, instead of some other audio and/or audio/video), encodes the voice into one or more voice packets, and transmits the one or more voice packets in a G_B_call_audio_1 308 (a first portion of a second group auditory data stream for group G_B) transmission to its serving BS 20, which then forwards the auditory data to the conference server 26.

While the following example as set forth in FIG. 3 focuses on unidirectional summing of group auditory data sourced from a transmitting SD from each of groups G_B 44 and G_A 42, in other embodiments, a source of group auditory data may instead be a dispatch console such as the dispatch console 38 of FIG. 1, which allows a dispatcher to generate and transmit dispatch instructions or other types of audio to one or more groups of SDs. Accordingly, the SD 14 of FIG. 3 could, in some embodiments, be replaced with the dispatch console 38 of FIG. 1, and same or similar processes as disclosed herein would be applied to the auditory data sourced from the dispatch console 38 and targeted at the group G_B 44. Other variations are possible as well.

At step 310, the conference server 26 receives the G_A_call_audio_1 304 transmission and the G_B_call_audio_1 308 transmission, decodes each transmission, and determines whether any other groups of SDs are interested in, subscribed to, or should otherwise receive the auditory data from either or both transmissions. In other embodiments, the determination at step 310 of whether any other groups of SDs are interested in, subscribed to, or should otherwise receive the auditory data for G_A 42 or G_B 44 could also be executed at a time at which a call request is transmitted and received at conference server 26 (from SD 12 or SD 14, respectively), and the determination saved and applied to subsequently received transmissions in the respective auditory data streams being transmitted by SD 12 and SD 14.

Depending on system configuration, priority summing of auditory data between groups at the conference server 26 could occur uni-directionally or omni-directionally. In uni-directional summing, auditory data may be summed from one group to one or more other groups, but not vice versa. In uni-directional summing, a hierarchical or individual subscription mapping must be maintained to identify which groups are interested in, subscribed to, or should otherwise receive auditory data from other groups. For uni-directional summing, the group that generated the auditory data currently being processed at the conference server 26 will be considered to be the source group, while each other group interested in, subscribed to, or which otherwise should receive the source group auditory data will be considered to be a target group.

In addition to the hierarchical or individual subscription mapping, a separate priority mapping must be maintained to determine, for those target groups interested in, subscribed to, or should otherwise receive a particular source group's auditory data, what relative priority level the source group (the group auditory data currently being processed at the conference server 26) is assigned relative to each target group (the interested groups). The relative priority level may then be used to set a relative signal gain when summing auditory data between the groups when both source and target groups are currently generating group auditory data.

In omni-directional summing, a source group's auditory data is omni-directionally mixed with all (or a pre-configured subset) target groups registered at the conference server 26. In omni-directional summing, each SD in a group can hear any transmitting SD in any other group of all of (or the pre-configured subset of) the groups at the conference server, as there is no uni-directional or one-way summing of group audio. While the need for a hierarchical or individual subscription mapping need not be maintained for omni-directional summing (although, in those cases where not all groups are summed together, a database of which groups are to be omni-directionally mixed with which other groups must still be maintained), the priority mapping must still be maintained to determine what relative priority level a source group should be assigned relative to each target group.

For either uni-directional or omni-directional summing, for those target groups that are not currently generating any group auditory data (e.g., not in a call) with which to sum a source group's audio, but are determined to be interested in, subscribed to, or should otherwise receive the source group's auditory data, the conference server 26 sends a PTT group call request to another network device such as a zone controller to set up a new call to each target group not already in a call and, once the call is granted by the another network device, the conference server 26 can merely transmit a copy of the auditory data from the source group to the target group, with or without any corresponding signal gain modification to the source group's auditory data.

For the remainder of this disclosure, uni-directional summing will be used as the exemplary summing configuration and should be assumed unless omni-directional summing functionality is specifically called out or differentiated.

Determining whether any target groups are interested in the auditory data from a particular source group may include determining what group the auditory data originates from (or is addressed to) and accessing a mapping to determine if any target groups should receive the auditory data from (or intended for) the determined source group. For example, and with respect to FIG. 1, the conference server 26 may retrieve a group identifier from the G_A_call_audio_1 304 transmission (e.g., from a previously transmitted call request, via a header, embedded in the auditory data, or via a channel identifier identifying a channel on which the call was transmitted, among other possibilities) identifying the originating group, and access a database such as database 28 to retrieve a group mapping. A first example group mapping is set forth in Table I as an inter-group subscription mapping.

TABLE I

Example Inter-Group Subscription Mapping

| Source Group (Identifier): | Target Groups: |
|---|---|
| G_A | <Null> |
| G_B | G_A, G_C |
| G_C | G_A |
| G_D | <Null> |

In the first example set forth in Table I, a first column may list each possible group call source group (by group identifier) in the system and a second column may list, for each source group, which target groups are interested in/subscribed to the originating group or which should otherwise receive the source group's auditory data. In the example set forth in Table I, for example, group G_B may be a higher priority group as it is subscribed to by most other groups in the system (e.g., groups G_A and G_C). More specifically, group G_B may be, for example, a commander or fire chief group, or some other group that it is likely to be communicating highly important information that should be made available to most or all other groups, independent of whether those other groups are already in an existing call or not. Furthermore, group G_B is not subscribed to or interested in any of the other groups, which means that no auditory data from the other groups will be directed back to group G_B (e.g., it is a one-way directional summing of group auditory data from group G_B to groups G_A and G_C, such that auditory data from groups G_A and G_C are not made available to group G_B SDs).

Group G_C may be a second level (intermediate priority) group that, while not subscribed to by the top level group G_B, is subscribed to by at least one other group G_A. Lastly, group G_A is the third level (lowest priority) group and does not have any other groups interested in its auditory data (e.g., its subscriber list is set to the <Null> value).

Group G_D has an assigned priority level of <Null>, and also does not subscribe to any other groups, and thus behaves in a traditional manner (e.g., no auditory data from other groups is copied to group G_D, and no auditory data from group G_D is copied to other groups). This allows certain groups to maintain their traditional operation and to work in a system also supporting priority summing of group auditory data for those groups that desire the feature.

Once it is determined which target groups (if any) are interested in the auditory data from a particular source group, the relative priority levels must be determined in order to properly set relative signal levels when summing auditory data between the source and target group(s). A first example group priority mapping is set forth in Table II.

TABLE II

Example Group Priority Mapping

| Priority Level (1 = Highest): | Member Groups: | Relative Signal Gain: |
|---|---|---|
| 1 | G_B | 0 dB |
| 2 | G_C | −4 dB |
| 3 | G_A | −8 dB |
| 4 | <Null> | −12 dB |

In this example, a first column sets forth a plurality of priority classes (1 to 4, 1 being the highest priority), a second column sets forth the corresponding member groups (based on group identifier) that are members of that priority level, and a third column sets forth the relative signal gain to apply when processing auditory data for groups belonging to the corresponding class. For example, if auditory data streams are received from G_B and G_C, when summed, a relative signal gain is applied to one or both of the auditory data streams to obtain a −4 dB relative signal gain of the auditory data of group G_B relative to group G_C. For example, this could be accomplished via a −4 dB gain (e.g., a 4 dB attenuation) of the G_C auditory data without modification to the G_B auditory data. In another example, this could be accomplished via a +4 dB gain of the G_B auditory data without modification to the G_C auditory data. Some intermediate application of gain to the G_B auditory data and attenuation to the G_C auditory data could be applied as well, so long as the total relative signal gain is −4 dB of the G_C auditory data relative to the G_B auditory data.

Similarly, if auditory data streams are received from G_B and G_A, when summed, a relative signal gain is applied to one or both of the auditory data streams to obtain a −8 dB gain (e.g., an 8 dB attenuation) to the auditory data of group G_A relative to group G_B. Auditory data streams received that are members of a same priority level are summed without any corresponding relative signal gain applied to either auditory data stream. In specific regard to omni-directional summing of group audio, a table the same or similar to Table II could be used to determine what relative signal gain to apply to source and/or target auditory data streams when summing the source group auditory data stream with each target group auditory data stream for all groups or for each group registered to be mixed with the source group at the conference server.

In some embodiments, Tables I and II may be combined into a single database or object, for example, to speed retrieval of information necessary for uni-directional priority summing of received auditory data streams.

TABLE III

Example Inter-Group Subscription and Priority Mapping

| Source Group (Identifier): | Target Groups: | Relative Signal Gain: |
|---|---|---|
| G_A | <Null> | <Null> |
| G_B | G_A | −8 dB |
|  | G_C | −4 dB |
| G_C | G_A | −4 dB |
| G_D | <Null> | <Null> |

In this example and similar to Table I, a left most column sets forth the source groups by identifier and a second column lists the target groups for each source group. In Table III, a third column is added that sets forth the relative signal gain to apply to the two auditory data streams when summing auditory data from the source group (left column) to the target group (middle column). For example, when summing auditory data from source group G_B to target group G_A, a relative signal gain of −8 dB (e.g., an 8 dB attenuation) is applied to the group G_A auditory data relative to the group G_B auditory data (via either or both a signal gain applied to the group G_B auditory data and a signal attenuation applied to the group G_A auditory data).

A second example group priority mapping is set forth in Table IV.

TABLE IV

Second Example Group Priority Mapping

| Priority Level (1 = Highest): | Member Groups: | Relative Signal Gain (RSG): | RSG Emergency: |
|---|---|---|---|
| 1 | G_B | 0 dB | 0 dB |
| 2 | G_C | −4 dB | −1 dB |
| 3 | G_A | −8 dB | −2 dB |
| 4 | <Null> | −12 dB | −4 dB |

The second example group priority mapping set forth in Table IV adds an additional column to the mapping set forth in Table II that separately sets out what relative signal gain (RSG) should be applied when the type of source call is an emergency call (as opposed to when the type of source call is a non-emergency call as set forth in the third column). Emergency calls may be differentiated from non-emergency calls through call signaling generated at the transmitting SD or dispatch console by setting an emergency call indicator in a call request, a call header, or embedded an emergency call indicator in the call payload frames including, for example, in link control messages. The conference server 26 may then use the signaled emergency call indicator to vary the signal gain (or attenuation) applied to the separate source and target auditory data streams when summing group auditory data.

For example, and with respect to Table IV above, if non-emergency auditory data streams are received from groups G_B and G_C, when summed, a relative signal gain is applied to one or both of the auditory data streams to obtain a −4 dB gain to the auditory data of group G_C relative to group G_B. However, if the same two auditory data streams were received from G_B and G_C, and it was signaled in the group G_C auditory data stream and determined by the conference server that the group G_C auditory data was emergency audio, a relative signal gain is applied to one or both of the auditory data streams to instead obtain a −1 dB gain (e.g., 1 dB attenuation) to the auditory data stream of group G_C relative to (the non-emergency auditory data stream of) group G_B. Thus, in this example, the emergency auditory data of group G_C experiences a decreased level of signal attenuation compared to if it had been non-emergency auditory data.

In a still further embodiment, conference server 26 may additionally or alternatively access a different type of uni-directional summing group mapping, such as an inter-group hierarchical mapping, to determine if any target groups are interested in receiving a source group's auditory data stream. An example inter-group hierarchical mapping is set forth in Table V.

TABLE V

Example Inter-Group Hierarchical Mapping

| Group (Identifier): | Group Hierarchical Level: |
|---|---|
| G_V, | 1 |
| G_W, G_X | 2 |
| <Null> | 3 |
| G_Y, G_Z | <Null> |

In the example inter-group hierarchical mapping set forth in Table V, a group hierarchy level is set forth in the $2^{nd}$ column and corresponding group call originating group(s) for each hierarchy level is identified in the $1^{st}$ column. In this example, all groups having a hierarchy level below a source group generating auditory data receive a copy of the auditory data stream of the higher hierarchy level source group's call. For example, and with respect to Table V, groups G_W and G_X would receive auditory data from group G_V, summed with any active auditory data of its own respective G_W or G_X group members, because their hierarchy level is below that of group G_V. Conversely, group G_V would not be copied on auditory data of groups having a hierarchy level below its hierarchy level, including in this example, groups G_W and G_X.

Whether groups at a same hierarchy level are copied on active auditory data could be configured based on the radio communication system operator's preference. For example, in one embodiment, groups G_W and G_X would always have their auditory data streams bi-directionally mixed together. In an alternative embodiment, groups G_W and G_X would never have their auditory data streams mixed together.

Groups G_Y and G_Z are assigned a priority level of <Null>, and are accordingly configured to behave in a traditional manner (e.g., no auditory data from other groups are copied to (or summed with) groups G_Y or G_Z, and no auditory data from groups G_Y or G_Z are copied to (or summed with) other groups). This allows certain groups to maintain their traditional operation and to work in a system also supporting priority summing of group auditory data streams for those groups that desire the feature.

Group priority mappings and corresponding relative signal levels same or similar to those set forth in Tables II and/or IV could be applied to the hierarchical mapping of Table V in a same or similar manner as that set forth above with respect to the inter-group subscription mapping of Table I.

Returning to and using the example set forth in Tables I and II above (although, in other embodiments, the examples set forth in Tables III-V could additionally or alternatively be used), at step 310, the conference server 26 accesses the stored group mapping (in this example, the example intergroup subscription mapping of Table I) and determines that no other groups are interested in the group auditory data received in the G_A_call_audio_1 304 transmission. Also at step 310, the conference server 26 accesses the stored group mapping and determines that groups G_A and G_C are both interested in the group auditory data received in the G_B_call_audio_1 308 transmission. The conference server 26 additionally determines that there is existing auditory data for group G_A 42 received at the conference server 26, but that there is no existing auditory data for group G_C 46 at this time.

In response to determining that there is existing auditory data for a target group (group G_A 42) that is subscribed to/interested in the auditory data stream of group G_B 44, the conference server 26 at step 310 also retrieves priority mapping information with respect to groups G_A and G_B. Using the example set forth in Table II above, the conference server 26 retrieves the priority mapping information (perhaps via a data store such as data store 28) and determines that a +8 dB relative signal gain should be applied to the group G_B auditory data stream relative to the group G_A auditory data stream when summing the portions of the corresponding auditory data streams received at the conference server 26 for groups G_B and G_A. The conference server then sums the two auditory data portions as a function of the determined relative signal gain between them. In one embodiment, the relative signal gain may be applied to one or both auditory data streams (e.g., +8 dB gain to the G_B auditory data, −8 dB gain, e.g. attenuation, to the G_A auditory data, or some gain applied to the G_B auditory data accompanying an attenuation to the G_A auditory data that results in a −8 dB relative signal gain between them) prior to the two auditory data stream portions being provided to a DSP, such as DSP 219 of FIG. 2, for summing. In another embodiment, the value of the relative signal gain may be provided to the summing circuit (e.g., DSP 219) along with the two auditory data stream portions and applied to the auditory data stream portions during the summing process. Other possibilities exist as well. As set forth with respect to FIG. 2, the priority summing of the auditory data may be executed by the conference server 26 in the parametric domain or in the time domain. The conference server 26 then transmits the summed auditory data back to the group G_A 42 SDs in the rep_summed_call_audio_1 312 transmission via BS 20.

Because there is no existing call and no existing corresponding auditory data stream from group G_C 46, the conference server 26 sends a PTT group call request to another network device such as a zone controller to set up a new call to group G_C and, once the call is granted by the another network device, the conference server 26 can merely transmit a copy of the auditory data from the G_B_call_audio_1 308 transmission to the group G_C 46 SDs in a rep_G_B_call_audio_1 316 transmission via the serving BS 22. Finally, and because group G_B 44 is not subscribed to (e.g., not interested in receiving a copy of) auditory data streams from any other groups, the conference server 26 simply sends the auditory data from the G_B_call_audio_1 308 transmission back to the group G_B 44 SDs in a rep_G_B_call_audio_1 314 transmission via the serving BS 20.

In an embodiment in which omni-directional summing is employed in the radio communications system (not shown in FIG. 3), and groups G_A 42, G_B 44, and G_C 46 are pre-configured at the conference server 26 to have their auditory data streams omni-directionally mixed with one another, the prioritized and summed auditory data stream transmitted back to the G_A 42 SDs via rep_summed_call_audio_1 312 would similarly be provided to the G_B 44 SDs in place of the rep_G_B_call_audio_1 314 transmission and provided to the G_C 46 SDs in place of the rep_G_B_call_audio_1 316 transmission.

Returning to the uni-directional summing example of FIG. 3, as indicated via dashed lines 320, the G_A 42 and G_B 44 group calls may continue in a manner similar to that set forth in message transmissions, receptions, and processing steps 304-314 indefinitely, until one or more of the group calls is terminated by an initiating/transmitting SD (e.g., SDs 12 and 14, in the above example). Alternatively, and in one embodiment, the priority summing of auditory data may be halted after a threshold period of time during which the SDs of the target group(s) can determine whether the source group call is of interest (or of more interest than a possibly simultaneously occurring group call in their own group) such that they may choose to join the source group call on the originating/source group in a traditional manner, such as by utilizing a user interface on their SD to change a channel switch, frequency selector, or other knob or input from its current setting to a setting to match a talkgroup, frequency, channel, or other group identifier of the call originating source group.

In the example set forth above, SDs in groups G_A 42 and G_C 46 may be copied in on the auditory data stream transmitted from group G_B 44 for only a threshold period of time (indicated via line 322 in FIG. 3), after which time the priority summing of auditory data originating from group G_B 44 to groups G_A 42 and G_C 46 is terminated. During the threshold period of time 322, users of SDs in groups G_A 42 and G_C 46 can determine whether they want to switch their SD to a channel corresponding to the originating source group G_B 44 to continue receiving auditory data from the originating source group G_B 44. Absent further action by the SD users in groups G_A 42 and G_C 46, the priority summing of auditory data from source group G_B 44 to the SD users in target groups G_A 42 and G_C 46 will cease after the threshold period of time 322 expires. The threshold period of time may be, for example, between 5 and 300 seconds, or between 5 and 60 seconds, or some other range of time.

For example, and as illustrated in FIG. 3, subsequent auditory data transmissions G_B_call_audio_2 334 and G_A_call_audio_2 332 from SDs 14 and 12, respectively, are received and processed at conference server 26 at step 340. Even though groups G_A 42 and G_C 46 are mapped as being subscribed to and/or interested in the auditory data from group G_B 44, because the threshold period of time 322 has expired (as determined by the conference server at step 344), subsequent portions of the auditory data stream from group G_B 44 are not provided to either of groups G_A 42 or G_C 46 for the remainder of the group G_B 44 call. Instead, and as illustrated in FIG. 3, the conference server 26, due to the expiration of the threshold period of time 322, determines that no other groups are interested in the subsequent portions of the group auditory data stream received in the G_B_call_audio_2 334 transmission (and as previously noted, determines that no other groups are interested in the group auditory data received in the G_A_call_audio_2 332 due solely to the inter-group subscription mapping and not the passage of time), and then (i) forwards the auditory data from the G_A_call_audio_2 332 transmission in the repeated rep_G_A_call_audio_2 342 transmission back to the group G_A 42 SDs via BS 20 and (ii) forwards the auditory data from the G_B_call_audio_2 334 transmission in the repeated rep_G_B_call_audio_2 344 transmission back to the group G_B 44 SDs via BS 20. As illustrated, and assuming that there is still no active transmitting SD in group G_C 46, no auditory data is provided to group G_C 46 SDs by the conference server 26 in this scenario. In some embodiments, an explicit call teardown message (not shown) may be transmitted to G_C 46 SDs after passage of the threshold period of time 322 to explicitly end G_C's 46 temporary receive-only participation in the G_B 44 call. In other embodiments where the source group call (G_B 44 in this case) ends prior to expiration of the threshold period of time 322, the explicit call teardown message may be transmitted after the call of interest is ended and before expiration of the threshold period of time 322. Other possibilities exist as well.

3. Conclusion

In accordance with the foregoing, an improved method and apparatus for allowing auditory data transmitted in one group to be received and heard in one or more other groups with its relative priority taken into consideration to avoid confusion and difficulty in communication across groups, and without requiring any ongoing calls in the other groups to be terminated. As a result, a more intuitive, useful, and efficient group communications system can be provided, improving communication capabilities of incidence response groups. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for priority summing of group auditory data, the method comprising:
   receiving, at a conference server, a first portion of a first group auditory data stream from one of a transmitting subscriber device of a first group of a plurality of subscriber devices and a dispatch console, for receipt by the first group of subscriber devices;

receiving, at the conference server, a first portion of a second group auditory data stream from a transmitting subscriber device of a second group of a plurality of subscriber devices, the second group of subscriber devices having no overlap with the first group of subscriber devices, for receipt by the second group of subscriber devices;

determining, by the conference server, that group auditory data generated from the first group of subscriber devices should be at least temporarily shared with the second group of subscriber devices, and responsively:

determining, by the conference server, a relative priority level of one of (i) the first group of subscriber devices relative to the second group of subscriber devices and (ii) the first portion of the first group auditory data relative to the first portion of the second group auditory data;

setting, by the conference server, different relative signal gains of the first portion of the first group auditory data and the first portion of the second group auditory data as a function of the determined relative priority level;

summing, by the conference server, the first portion of the first group auditory data with the first portion of the second group auditory data to form summed group auditory data as a function of the set different relative signal gains; and forwarding, by the conference server, the summed group auditory data towards the second group of subscriber devices.

2. The method of claim 1, wherein the first group of subscriber devices are members of a first talkgroup having a first talkgroup identifier, and wherein the second group of subscriber devices are members of a second talkgroup having a second talkgroup identifier different from the first talkgroup identifier.

3. The method of claim 2, wherein the first talkgroup operates on a first assigned traffic channel at a first trunked base station and the second talkgroup operates on a second assigned traffic channel at a second trunked base station.

4. The method of claim 1, wherein determining the relative priority level of one of (i) the first group of subscriber devices relative to the second group of subscriber devices and (ii) the first portion of the first group auditory data relative to the first portion of the second group auditory data comprises determining one of (i) that one of the first group auditory data stream and the second group auditory data stream includes emergency group auditory data and (ii) that the first group is a higher priority group than the second group or the second group is a higher priority group than the first group.

5. The method of claim 4, wherein determining that the one of the first group auditory data stream and the second group auditory data stream includes emergency group auditory data comprises (i) decoding an emergency call indicator from one of a call request preceding the first group auditory data stream, a header appended to the first group auditory data stream, and embedded in the first group auditory data stream and (ii) decoding an emergency call indicator from one of a call request preceding the second group auditory data stream, a header appended to the second group auditory data stream, and embedded in the second group auditory data stream.

6. The method of claim 1, wherein determining the relative priority level of one of (i) the first group of subscriber devices relative to the second group of subscriber devices and (ii) the first portion of the first group auditory data relative to the first portion of the second group auditory data comprises one of (i) determining, by the conferencing server, that the second group of subscriber devices is a higher priority group of subscriber devices than the first group of subscriber devices by accessing a priority mapping from a data store of priority information and determining, from the priority mapping, that the second group of subscriber devices is a higher priority group of subscriber devices than the first group of subscriber devices and responsively setting a relative signal gain of the first group auditory data lower than that of the second group auditory data and (ii) determining, by the conferencing server, that the first group of subscriber devices is a higher priority group of subscriber devices than the second group of subscriber devices by accessing the priority mapping from the data store of priority information and determining, from the priority mapping, that the first group of subscriber devices is a higher priority group of subscriber devices than the second group of subscriber devices and responsively setting a relative signal gain of the second group auditory data lower than that of the first group auditory data.

7. The method of claim 1, wherein the first group of subscriber devices are operating on a first frequency at a first conventional base station, and the second group of subscriber devices are operating on a second frequency at a second conventional base station different from the first conventional base station.

8. The method of claim 1, further comprising refraining from summing the first portion of the second group auditory data into the first portion of the first group auditory data prior to forwarding, by the conferencing server, the first group auditory data to the first group of subscriber devices.

9. The method of claim 1, further comprising forwarding the summed group auditory data towards the first group of subscriber devices.

10. The method of claim 1, further comprising receiving, at the conferencing server, a first portion of a third group auditory data stream from a first transmitting subscriber device of a third group of subscriber devices;

determining, by the conferencing server, relative priority levels of one of (i) the first and second groups of subscriber devices relative to the third group of subscriber devices and (ii) the first and second portions of the first and second group auditory data relative to the first portion of the third group auditory data; and setting different relative signal gains of the first portion of the first, second, and third group auditory data as a function of the determined relative priority levels, and selectively summing the first portion of the third group auditory data stream with auditory data received for one or both of the first and second groups of subscriber devices in accordance with set priority levels.

11. The method of claim 10, further comprising forwarding, by the conferencing server, the first portion of the third group auditory data towards the third group of subscriber devices.

12. The method of claim 10, further comprising forwarding the second summed group auditory data towards the third group of subscriber devices.

13. The method of claim 1, further comprising:

continuing to sum, by the conferencing server, further group auditory data generated for the first group of subscriber devices with further group auditory data generated by the second group of subscriber devices for a predetermined threshold period of time and as a function of the set different relative signal gains, and forwarding corresponding further summed group auditory data to the second group of subscriber devices for the predetermined threshold period of time; and after the predetermined threshold period of time, refraining from summing further group auditory data generated for the second group of subscriber devices with further group auditory data generated for the first group of subscriber devices, and instead, forwarding subsequent group auditory data generated for the second group of subscriber devices to the second group of subscriber devices without summing subsequent auditory data generated for the first group of subscriber devices.

14. The method of claim 13, wherein the predetermined threshold period of time is between 5 and 300 seconds.

15. The method of claim 1, wherein summing, by the conferencing server, the first portion of the first group auditory data with the first portion of the second group auditory data to form summed group auditory data as a function of the different relative signal gains comprises summing the first portion of the first group auditory data with the first portion of the second group auditory data in the parametric domain.

16. A conference server for priority summing of group auditory data, the server comprising:
    a transceiver;
    a data store; and
    one or more processors configured to:
        receive, via the transceiver, a first portion of a first group auditory data stream from one of a transmitting subscriber device of a first group of a plurality of subscriber devices and a dispatch console, for receipt by the first group of subscriber devices;
        receive, via the transceiver, a first portion of a second group auditory data stream from a transmitting subscriber device of a second group of a plurality of subscriber devices, the second group of subscriber devices having no overlap with the first group of subscriber devices, for receipt by the second group of subscriber devices;
        determine that group auditory data generated from the first group of subscriber devices should be at least temporarily shared with the second group of subscriber devices, and responsively:
            determine, via the data store, a relative priority level of one of (i) the first group of subscriber devices relative to the second group of subscriber devices and (ii) the first portion of the first group auditory data relative to the first portion of the second group auditory data;
            set different relative signal gains of the first portion of the first group auditory data and the first portion of the second group auditory data as a function of the determined relative priority level;
            sum the first portion of the first group auditory data with the first portion of the second group auditory data to form summed group auditory data as a function of the set different relative signal gains; and
            forward, via the transceiver, the summed group auditory data towards the second group of subscriber devices.

17. The conference server of claim 16, wherein the processor is further configured to determine the relative priority level of one of (i) the first group of subscriber devices relative to the second group of subscriber devices and (ii) the first portion of the first group auditory data relative to the first portion of the second group auditory data by determining one of (i) that one of the first group auditory data stream and the second group auditory data stream includes emergency group auditory data and (ii) that the first group is a higher priority group than the second group or the second group is a higher priority group than the first group.

18. The conference server of claim 17, wherein the processor is further configured to determine that the one of the first group auditory data stream and the second group auditory data stream includes emergency group auditory data by (i) decoding an emergency call indicator from one of a call request preceding the first group auditory data stream, a header appended to the first group auditory data stream, and embedded in the first group auditory data stream and (ii) decoding an emergency call indicator from one of a call request preceding the second group auditory data stream, a header appended to the second group auditory data stream, and embedded in the second group auditory data stream.

19. The conference server of claim 16, wherein the processor is further configured to determine the relative priority level of one of (i) the first group of subscriber devices relative to the second group of subscriber devices and (ii) the first portion of the first group auditory data relative to the first portion of the second group auditory data by one of (i) determining that the second group of subscriber devices is a higher priority group of subscriber devices than the first group of subscriber devices by accessing a priority mapping from a data store of priority information and determining, from the priority mapping, that the second group of subscriber devices is a higher priority group of subscriber devices than the first group of subscriber devices and responsively setting a relative signal gain of the first group auditory data lower than that of the second group auditory data and (ii) determining that the first group of subscriber devices is a higher priority group of subscriber devices than the second group of subscriber devices by accessing the priority mapping from the data store of priority information and determining, from the priority mapping, that the first group of subscriber devices is a higher priority group of subscriber devices than the second group of subscriber devices and responsively setting a relative signal gain of the second group auditory data lower than that of the first group auditory data.

20. The conference server of claim 16, wherein the processor is further configured to:
    continue to sum further group auditory data generated for the first group of subscriber devices with further group auditory data generated by the second group of subscriber devices for a predetermined threshold period of time and as a function of the set different relative signal gains, and forward, via the transceiver, corresponding further summed group auditory data to the second group of subscriber devices for the predetermined threshold period of time; and
    after the predetermined threshold period of time, refrain from summing further group auditory data generated for the second group of subscriber devices with further group auditory data generated for the first group of subscriber devices, and instead, forward, via the transceiver, subsequent group auditory data generated for the second group of subscriber devices to the second group of subscriber devices without summing subsequent auditory data generated for the first group of subscriber devices.

* * * * *